United States Patent
Laraqui

(10) Patent No.: US 9,692,514 B2
(45) Date of Patent: Jun. 27, 2017

(54) NETWORK NODE AND A METHOD THEREIN ENABLING A FIRST UNIT TO CONNECT OR TO BE CONNECTED AD-HOC TO A SECOND UNIT

(71) Applicant: Telefonaktiebolaget LM Ericsson (publ), Stockholm (SE)

(72) Inventor: Kim Laraqui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/377,074

(22) Filed: Dec. 13, 2016

(65) Prior Publication Data
US 2017/0093496 A1 Mar. 30, 2017

Related U.S. Application Data

(63) Continuation of application No. 14/372,638, filed as application No. PCT/SE2012/050122 on Feb. 9, 2012, now Pat. No. 9,553,668.

(51) Int. Cl.
*H04B 10/00* (2013.01)
*H04B 10/2575* (2013.01)
(Continued)

(52) U.S. Cl.
CPC ...... *H04B 10/25753* (2013.01); *H04W 76/02* (2013.01); *H04W 76/028* (2013.01); *H04W 84/18* (2013.01); *H04W 88/085* (2013.01)

(58) Field of Classification Search
CPC .......... H04B 10/25753; H04W 76/028; H04W 76/02; H04W 24/02; H04W 76/022; H04W 84/18; H04W 88/085
See application file for complete search history.

(56) References Cited

U.S. PATENT DOCUMENTS

| | | | | |
|---|---|---|---|---|
| 6,728,484 | B1 * | 4/2004 | Ghani | H04J 14/0227 385/50 |
| 6,842,439 | B2 * | 1/2005 | Zeitfuss | H04B 10/1125 370/277 |

(Continued)

FOREIGN PATENT DOCUMENTS

| EP | 2 012 547 A1 | 1/2009 |
|---|---|---|
| EP | 2 482 565 A1 | 8/2012 |

(Continued)

OTHER PUBLICATIONS

"Common Public Radio Interface (CPRI); Interface Specification", CPRI Specification V5.0, (Sep. 21, 2011), 119 pages.

(Continued)

*Primary Examiner* — Danny Leung
(74) *Attorney, Agent, or Firm* — Nicholson De Vos Webster & Elliott LLP

(57) ABSTRACT

Embodiments herein relate to a method in a network node configured in an optical network for enabling a first unit to connect ad-hoc to a second unit in a system configured for remote radio units and main units. The network node receives a connection request from the first unit over the optical network. The network node establishes a connection, to the first unit, for control data. The network node stores control data regarding the first unit. The control data is retrieved from the first unit over the established connection and wherein the control data enables the first unit to connect/be connected ad-hoc to the second unit for transferring user data over a physical path through the optical network.

18 Claims, 6 Drawing Sheets

(51) Int. Cl.
*H04W 76/02* (2009.01)
*H04W 84/18* (2009.01)
*H04W 88/08* (2009.01)

(56) References Cited

U.S. PATENT DOCUMENTS

| | | | | |
|---|---|---|---|---|
| 7,424,225 B1* | 9/2008 | Elliott | H04B 10/1149 | 398/115 |
| 7,885,601 B2* | 2/2011 | Kawakami | H04L 45/122 | 455/11.1 |
| 8,019,227 B2* | 9/2011 | Iizuka | H04B 10/1125 | 382/103 |
| 2004/0057543 A1* | 3/2004 | Huijgen | H04J 3/0682 | 375/356 |
| 2004/0096222 A1* | 5/2004 | Cagenius | H04B 10/25758 | 398/115 |
| 2005/0135284 A1* | 6/2005 | Nanda | H04L 29/06068 | 370/294 |
| 2005/0240849 A1* | 10/2005 | Muranishi | G06F 11/26 | 714/735 |
| 2005/0282494 A1* | 12/2005 | Kossi | H04W 88/06 | 455/41.2 |
| 2007/0025738 A1* | 2/2007 | Moore | H04B 10/1149 | 398/189 |
| 2007/0237316 A1* | 10/2007 | Tanabe | H04L 12/2818 | 379/102.03 |
| 2008/0229025 A1* | 9/2008 | Plamondon | G06F 12/0862 | 711/126 |
| 2010/0128676 A1 | 5/2010 | Wu et al. | | |
| 2010/0142421 A1* | 6/2010 | Schlicht | H04W 4/20 | 370/310 |
| 2010/0226304 A1* | 9/2010 | Shoji | H04B 1/40 | 370/315 |
| 2011/0222434 A1* | 9/2011 | Chen | H04B 7/022 | 370/254 |
| 2011/0243553 A1* | 10/2011 | Russell | G06Q 30/0631 | 398/25 |
| 2011/0310810 A1* | 12/2011 | Kenington | H04W 88/085 | 370/329 |
| 2011/0311226 A1* | 12/2011 | Smith | G02B 6/483 | 398/45 |
| 2012/0202425 A1* | 8/2012 | Glezerman | H04W 84/18 | 455/41.2 |
| 2013/0017823 A1* | 1/2013 | Mao | H04W 36/04 | 455/424 |
| 2013/0089336 A1* | 4/2013 | Dahlfort | H04J 14/0282 | 398/115 |
| 2013/0148502 A1* | 6/2013 | Yang | H04L 43/0811 | 370/235 |
| 2013/0177321 A1* | 7/2013 | DeVaul | H04B 10/1129 | 398/115 |
| 2013/0291013 A1* | 10/2013 | Choi | H04H 20/59 | 725/33 |
| 2014/0121890 A1* | 5/2014 | Gercekci | G08C 17/02 | 701/33.2 |
| 2014/0226552 A1* | 8/2014 | Niu | H04W 4/06 | 370/312 |
| 2014/0241315 A1* | 8/2014 | Niu | H04L 67/1091 | 370/331 |
| 2014/0376920 A1* | 12/2014 | Laraqui | H04W 24/02 | 398/115 |

FOREIGN PATENT DOCUMENTS

| | | |
|---|---|---|
| RU | 2370916 C1 | 10/2009 |
| RU | 2010125237 A | 12/2011 |
| WO | 2009039396 A2 | 3/2009 |
| WO | 2009039396 A3 | 3/2009 |

OTHER PUBLICATIONS

"C-RAN The Road Towards Green RAN", White Paper, Version 2.6 (Sep. 2013), 61 pages.
International Search Report, Application No. PCT/SE2012/050122, Mar. 18, 2013, 4 pages.
Farrel, et al., "A Path Computation Element (PCE)—Based Architecture", Network Working Group Request for Comments 4655, http://www.ietf.org/rfc/rfc4655.txt, 41 pages, (Aug. 2006).
Hayashi, Rie, et al., "Optical Plug and Play Technique for Automatic GMPLS Network Construction", IEICE Trans. Commun., vol.E94-B, No. 7, Jul. 2011, 11 Pages.
Huitao, Wang, et al., "C-RAN Bearer Network Solution", Nov. 18, 2011, 7 pages.
Viannie, E., et al., "Generalized Multi-Protocol Label Switching (GMPLS) Architecture", Oct. 2004, 70 pages, Network Working Group, Request for Comments: 3945, The Internet Society.
Official Action, RU Application No. 2014136117/07(058461), dated May 24, 2015, 9 pages.
Decision to Grant, RU Application No. 2014136117/07(058461), mailed Jun. 23, 2015, 14 pages.
Non-Final Office Action for U.S. Appl. No. 14/372,638, mailed Oct. 20, 2015, 22 pages.
International Preliminary Report on Patentability, Application No. PCT/SE2012/050122, dated Aug. 12, 2014, 10 pages.
Extended European Search Report, EP Application No. 12867830.7, dated Nov. 9, 2015, 6 pages.
Non-Final Office Action for U.S. Appl. No. 14/372,638, mailed May 3, 2016, 18 pages.
Notice of Allowance for U.S. Appl. No. 14/372,638, mailed Sep. 22, 2016, 11 pages.

* cited by examiner

NETWORK NODE AND A METHOD THEREIN ENABLING A FIRST UNIT TO CONNECT OR TO BE CONNECTED AD-HOC TO A SECOND UNIT

CROSS-REFERENCE TO RELATED APPLICATIONS

This application is a continuation of U.S. application Ser. No. 14/372,638, filed Jul. 16, 2014, which is the National stage of International Application No. PCT/SE2012/050122, filed Feb. 9, 2012, which are hereby incorporated by reference.

TECHNICAL FIELD

Embodiments herein relate to a network node and a method therein. In particular, embodiments herein relate to enable a first unit to connect or to be connected ad-hoc to a second unit in a system configured for remote radio units and main units.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

A system configured for remote radio units and main units for mobile backhaul separates a radio base station into main units (MU), also referred to as base band units, and remote radio units (RRUs), connected via e.g. an optical network. The MUs may be centralized and located e.g. 10's of km from the remote radio units, which remote radio units are placed close to the radio antennas, e.g. in antenna masts. This will minimize feeder and jumper losses between antenna and remote radio units, which is often a major challenge to address in most radio communications networks, in particular to enhance the uplink capacity of mobile services. This system configured for remote radio units and main units is gaining significant interest and has some clear advantages, e.g. when it comes to installation of the remote radio units close to the antennas.

The interface between the main units and remote radio units is typically an optical Non-Return to Zero (NRZ) signal, which is a sampled In-phase Quadrature (I/Q) air interface waveform. Sampling the air waveform makes the remote radio unit implementation relatively simple but leads to very high bitrates of the optical signal, in the order of 1.25 Gbps per antenna. In parallel, advances in e.g. metro and aggregation optical networks enable seamless and common control and management planes to be established between the Packet and Optical domain, e.g. through the use of Generalized Multi-Protocol Label Switching (GMPLS). Combined with convergence of optical solutions on both sides of the metro/access network divide, e.g. Wave Division Multiplexing (WDM) or WDM-Passive Optical Network (PON), this creates new dynamics in the relations between transport and radio network solutions of tomorrow.

A Common Public Radio Interface (CPRI) specifies a Time Division Multiplexing (TDM) like protocol for Radio Base Station (RBS) configurations in a system configured for remote radio units and main units over a first layer. The application of CPRI between the main units and the remote radio units is static, i.e. determined as the RBS is deployed, and its configuration is only changed as part of a predetermined topology involving the main units and the remote radio units.

The CPRI defines a Master/Slave protocol which is used to connect a Radio Entity Controller (REC), a Radio Entity (RE). In a typical configuration, the REC will be used in a Main Unit to control RE(s) in remote radio units.

A typical location of remote radio units has a plurality of remote radio units and antennas. To reduce the required number of fibers connected to the location of remote radio units, the remote radio units are daisy-chained, i.e. wired together in sequence or in a ring, to generate a multiplexed digital signal of up to 10 Gbps, which is also the highest rate supported by the protocol generally used between a remote radio unit and a main unit, i.e. the CPRI. A more complex CPRI setup with adjacent remote radio units communicating in cascade is today used, and then a middle-remote radio unit between a main unit and remote radio unit is acting both as a Master Port, towards the remote radio unit, and a Slave Port, towards the main unit, so as to support multiplexing/demultiplexing of a CPRI stream. Whatever topology is used, the CPRI specification includes calibration facilities to enable Master-Slaves to negotiate on CPRI rates to use, including calculating offsets so that different distances between antennas and main units may be factored in before transmission over the air interface. CPRI also allows for re-calibration to occur if necessary.

The relationship between the main unit and the remote radio unit is static. Thus, there are no means for either the main unit or the remote radio unit to announce its presence and preferences to its environment, prior to connecting to another appropriate main/remote radio unit of this environment. In CPRI today, when connecting entities to one another, by definition the topology has already been determined prior to this. First, physical topologies are established between the main unit and remote radio units in a daisy chain manner. Next, the main unit and remote radio units communicate and create CPRI connections between one another according to a master and slave protocol. There are no ways to connect remote radio units and main units ad-hoc to one another.

SUMMARY

An object of embodiments herein is to enable a first unit to connect or to be connected ad-hoc to a second unit in a system configured for remote radio units and main units.

According to an aspect of embodiments herein the object is achieved by a method in a network node for enabling a first unit to connect or to be connected ad-hoc to a second unit in a system configured for remote radio units and main units. The network node is comprised in an optical network. The network node receives a connection request from the first unit over the optical network. The network node establishes a connection, to the first unit, for control data. The network node stores control data, regarding the first unit, which control data is retrieved from the first unit over the established connection. The retrieved control data enables the first unit to connect or to be connected ad-hoc to the second unit for transferring user data over a physical path through the optical network.

According to still another aspect the object is achieved by a network node adapted for enabling a first unit to connect or to be connected ad-hoc to a second unit in a system configured for remote radio units and main units. The network node is configured to be comprised in an optical network and comprises an input or output interface configured to receive a connection request from the first unit over the optical network. The network node further comprises an establishing circuit configured to establish a connection, to the first unit, for control data. The network node further comprises a storing circuit configured to store control data regarding the first unit. As stated above the control data, retrieved from the first unit over the established connection, enables the first unit to connect or to be connected ad-hoc to the second unit for transferring user data over a physical path through the optical network.

Thus, embodiments herein enable, through the usage of the stored control data e.g. topology and configuration data, the first unit, e.g. a remote radio unit or a main unit, to connect or to be connected ad-hoc to the second unit, e.g. a main unit or a remote radio unit. Thereby, providing a system wherein main units and remote radio units relate to one another in a more flexible manner without requiring pre-configured topology of the main and remote radio units.

BRIEF DESCRIPTION OF THE DRAWINGS

Embodiments will now be described in more detail in relation to the enclosed drawings, in which.

DETAILED DESCRIPTION

Figure 1:
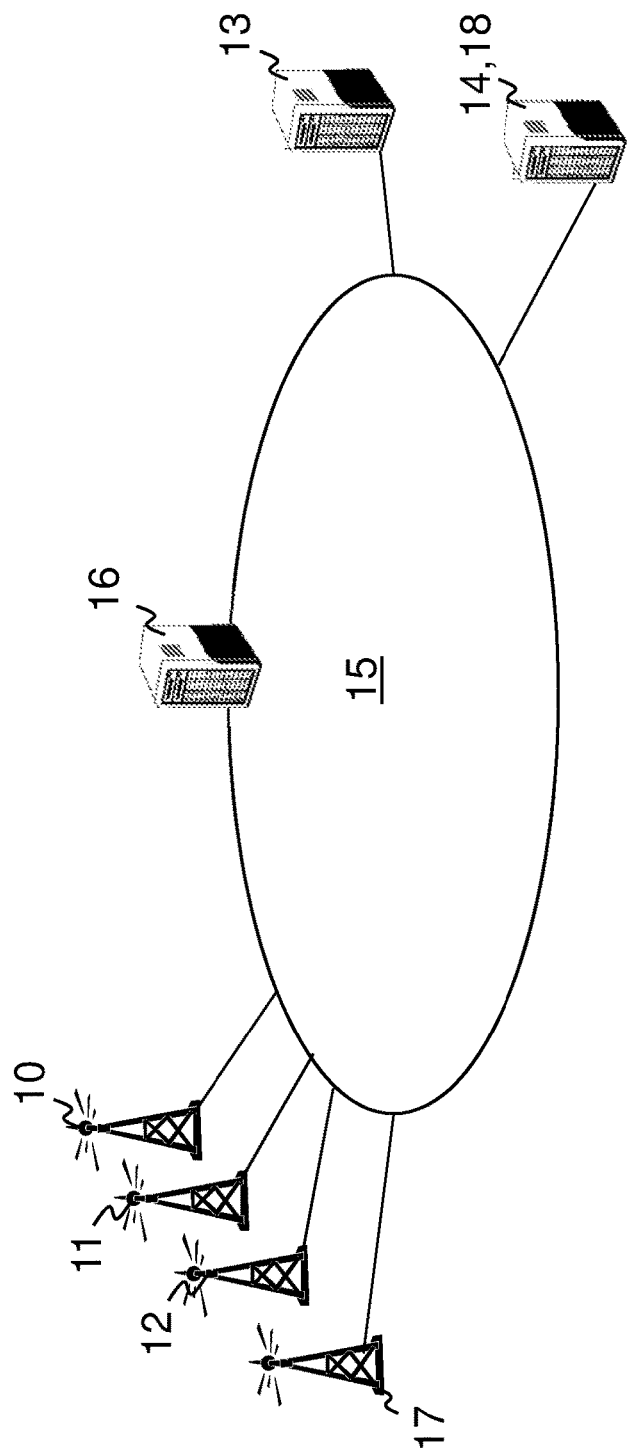
FIG. 1 is a schematic overview depicting a system according to embodiments herein.

FIG. 1 is a schematic overview of a system configured for remote and main units. The system is compliant with a number of radio access technologies such as LTE, LTE-Advanced, WCDMA, GSM/EDGE, WiMax, or UMB, just to mention a few possible implementations. The system comprises radio base stations that are separated into remote radio units (RRUs), as acting in the role of Radio Equipments (RE), exemplified as a first RRU 10, a second RRU 11, and a third RRU 12, and main units (MU), also referred to as base band units acting as a Radio Equipment Control units (REC), exemplified as a first main unit 13 and a second main unit 14 and connected via an optical network 15. Furthermore, in the optical network 15 a network node 16, also referred to as CPRI Pseudo Master/Slave Entity (CPMS), is comprised. Embodiments herein relates to enable a first unit 17, exemplified in the figures as a RRU, to connect or to be connected ad-hoc to a second unit 18, exemplified as the second main unit 14. The network node 16 receives a connection request from the first unit 17 and establishes a connection for control data, or for a purpose of exchanging control data, to the first unit 17. The network node 16 then retrieves control data from the first unit 17. The control data comprises topology data and/or configuration data such as links, ports, technology, antenna characteristics, Radio standard supported by the RRU, frequency bands it uses, bandwidth, vendor, release version, geographical position, operator, and/or similar. This control data is stored at a central database or locally at the network node 16. The network node 16 may then determine a physical path for user data from the first unit 17 through the optical network 15 to the second unit 18 based on the topology data and configuration data stored in the database. The first unit 17 may then connect ad-hoc, directly or at a later time, to the second unit 18 via the optical network connecting through the determined physical path. In case the first unit 17 is a main unit and the second unit 18 is a remote radio unit, the solution enables the first unit 17 to be connected to the second unit 18. The physical path may be determined by the network node 16, or other control node that has access to the control data and other information collected by network node 16 in the example.

Embodiments herein result in a change in deploying mobile networks. Main and Remote radio units are just connected to the optical network 15, also referred to as a smart metro optical network, where the network node 16 is provided, after which nodes, such as optical switches, in the optical network 15 involved, will configure and establish the necessary connectivity. The embodiments disclosed herein move away from a traditional model of having to determine a physical topology before connecting the first unit 17 to the second unit 18, towards a model where topology is flexible and resources, such as remote radio units 10-12, 17 and main units 13,14,18, can be added ad-hoc.

Connecting ad-hoc the first unit 17 to the second unit 18 means that the process of connecting does not rely on a preexisting infrastructure, such as configuration of optical switches in wired networks or access points in radio communications networks. Instead, the remote radio units or main units may connect or to be connected to one another without configuring the connection path based on a topology that has already been determined prior to this.

Embodiments herein split CPRI into a control plane (CP) and an optional data plane by means of Virtual Master/Slave CPRI entities emulating real CPRI entities transparently i.e. with no impact on standard CPRI entities, enabling the first unit 17 and the second unit 18 to connect ad-hoc to any virtual master and slave respectively. Then the virtual master or slave may agree on reconnecting, directly or at any later point in time, their remote radio unit or main unit in an optimal fashion including directly without involvement of any virtual entities. These reconnected remote radio unit and main unit may then renegotiate and recalibrate their CPRI interfaces. CPRI has both a control and data channel, once a connection is established between units. CP herein means a use of CPRI connections, both data and control channels of CPRI, in order for the CPMS to drain the control data from the first unit 17. After this, when the first unit 17 connects to the second unit 18 for exchanging user data, this is referred to as the data plane. The control plane and data plane may also be referred to as control phase and data phase.

All functions necessary for a large main unit - remote radio unit deployment may also be more easily addressed as a result, since a Main-Remote link is provided as a part of a metro optical network solution enabling resilience, load-balancing, common Operation and Maintenance (OAM). The resilience, load-balancing, common Operation and Maintenance (OAM) is enabled since visibility of services used is also provided over optical layer connectivity, via the virtual entities in the network node 16, and also aggregation of CPRI traffic when needed.

One reason behind embodiments herein is to detach a main unit and a remote radio unit in a way that enables a use of standard CPRI entities, but still allows for those CPRI entities to relate and communicate in a more flexible way to one another.

Figure 2:
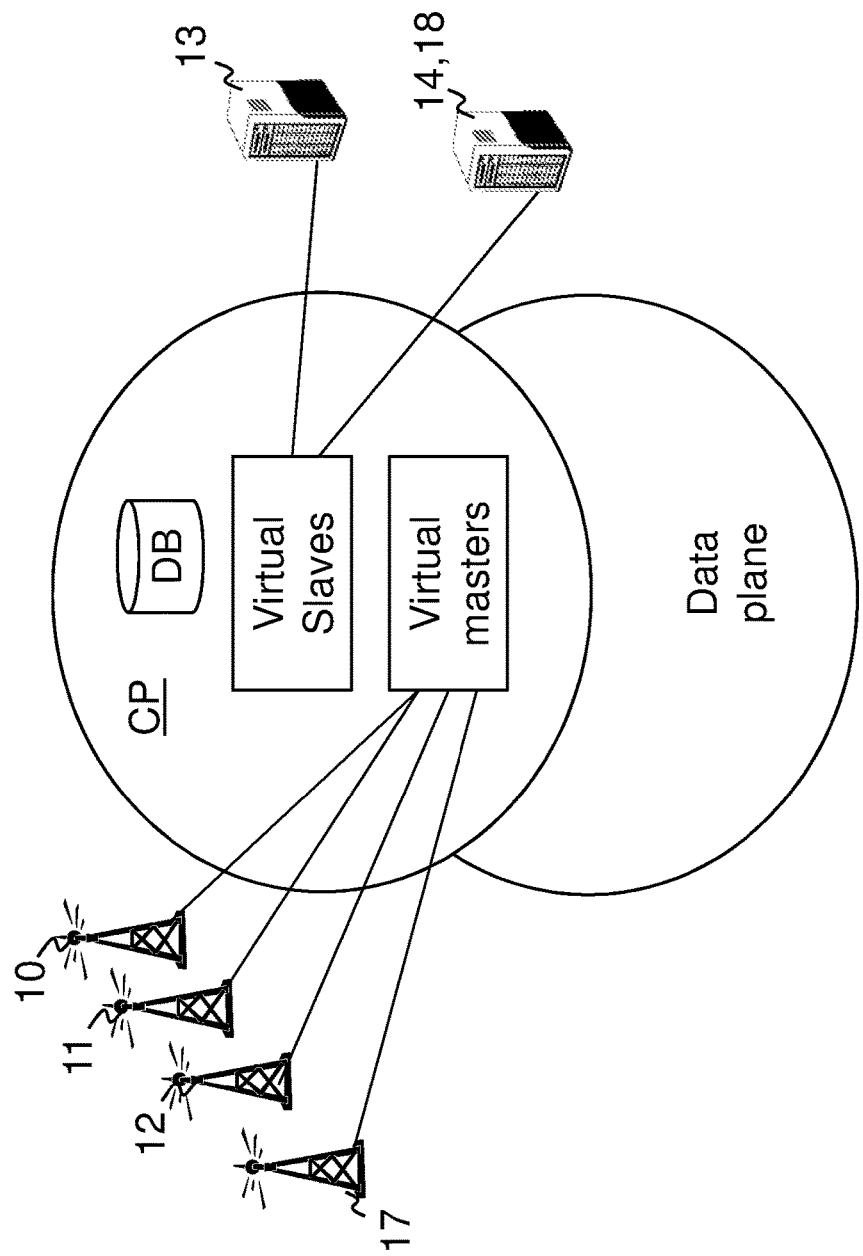
FIG. 2 is a schematic overview depicting a system in an initial state according to embodiments herein.

FIG. 2 is a block diagram depicting a system according to embodiments disclosed herein. Some embodiments herein disclose a CPRI in a split architecture with a control plane (CP) and a data plane, also referred to as an In-phase Quadrature (IQ) plane. Main unit and/or Remote radio units use standard CPRI to connect to the control plane, after which this control plane will decide how to reconnect the different units depending on resources available in the data plane. In this illustrated example each first unit and each second unit is connecting ad-hoc to the system via the optical network enabling each first unit and each second unit to be connected to one another. Thus, each first unit, being exemplified as the first unit 17, the first RRU 10, the second RRU 11, and the third RRU 12, is connecting to the network node 16, or actually to a virtual master entity in the network node 16. E.g. the first unit 17, when put into operation, is directed to a virtual entity in the network node 16 connecting the two entity types. The virtual entity or entities are part of what could be denoted the control plane, also referred to as CPRI CP, in the architecture. The control plane can be implemented as a central entity or distributed. The split of the CPRI may be structured so that the control and data planes are implemented by means of different entities. Furthermore, in the example of connecting main units 13,14, 18 each main unit when connecting to the system connects to a virtual slave entity within the network node 16. As stated above, also the virtual slave entity or entities are part of the CP. The data plane is used for distributing user data within the system. Thus, the initial state of the system is represented in FIG. 2 The network node 16 then collects or retrieves the control data. This control data is stored at a database (DB), located externally or locally at the network node 16. The network node 16 may then, based on the retrieved control data, determine a physical path for connecting the different first units to the second units. Thus, the first and second units 17,18 communicate with their virtual counterparts, i.e. Virtual Slave/Virtual Master respectively. This may involve standard CPRI rate negotiations as well as control & management message exchanges. The first and second units 17,18 do not need to be aware that the other end is virtual. Once the CPRI entities, i.e., the virtual entities, in the CP has examined the units connected to the system, the virtual entities or network node 16 may disconnect from those units, since now the network node 16 is aware of the first and second units 10-14, 17, 18 units connected to it.

Figure 3:
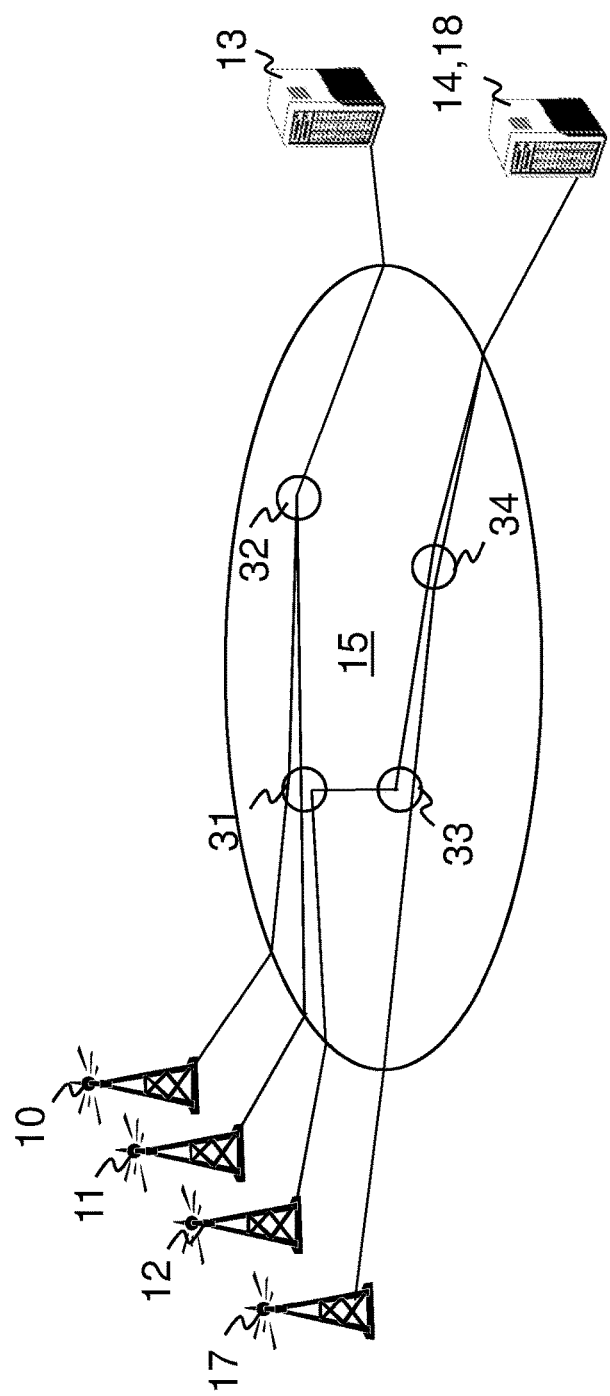
FIG. 3 is a schematic overview depicting physical paths in an optical network according to embodiments herein.

FIG. 3 is a schematic overview depicting physical paths within the optical network 15, connecting the different units. This may be an outcome of the retrieved control data stored and analysed by the network node 16. Thus, before user data may flow over the connection between the first unit 17 and the second unit 18, e.g. remote radio unit and main unit, the Virtual CPRI entities will determine how the first unit 17 and the second unit 18 may be connected to one another. E.g. a central switching facility may be shared by remotely located RRUs and MU pools: It can involve the use of GMPLS and/or other protocols in the optical network 15 to find and establish a suitable optical path between the first unit 17 and the second unit 18. Following this, the virtual entities disconnect themselves from their respective first or second unit 10-14,17,18. At this point, the, e.g., first unit 17 may re-initiate a CPRI calibration procedure over the newly established physical path between the first unit 17 and the second unit 18. This is within the realm of standard CPRI procedures. In certain cases, e.g. for reasons of aggregation, the virtual entities will need to be part of the flow of IQ data, and act as CPRI multiplexers/de-multiplexers. In the illustrated example, the first RRU 10 is connected to the first main unit 13 via a first optical switch 31 and a second optical switch 32. Similarly, the second RRU 11 is connected to the first main unit 12 via the first optical switch 31 and the second optical switch 32. The third RRU 12 is connected to the second main unit 14, or the second unit 18, via the first optical switch 31, a third optical switch 33 and a fourth optical switch 34. The first unit 17 is connected to the second unit 18 via the third optical switch 33 and the fourth optical switch 34. This has been determined by the network node 16 based on the retrieved control data. Thus, according to embodiments herein IQ data flows over the optical network 15, with connections established via the radio network node 16. Thus, after the virtual entities in the CP have retrieved control data to be used to found a physical path between e.g. the first unit 17 and the second unit 18, the virtual entities may disconnect themselves from the initial connections to different units 10-14, 17, 18 and connect each pair of units over a respective physical path. As an effect, the first unit 17 and second unit 18 will automatically re-initiate the CPRI procedures for negotiations and calibration. There will often be several alternatives for connectivity, e.g. connecting the first unit 17 and the second unit 18 directly to one another without interference from virtual entities. This doesn't involve any optical-electrical-optical (O-E-O) conversion. If enough wavelengths are available in the optical network 15, e.g. a metro optical network, then this is a way to proceed. However, although the connection is registered in the DB, the optical network 15 cannot monitor performance on the connection. Additionally or alternatively, the first unit 17 may connect to the second unit 18 by keeping one or several of the virtual entities in the physical path. Any combination of virtual entities can be foreseen, e.g. one or several O-E-O hops where the virtual entities involved act as CPRI multiplexers/de-multiplexers. The reason for keeping an OEO hop may be to enable aggregation of CPRI flows, or to keep a virtual entity in a packet flow so that this packet flow may be monitored for e.g. quality such as counting Bit Error Rate (BER), measuring delay variations or similar over the virtual entity. Here the virtual entity acts as a probe, e.g. monitoring a few selected RRU/MU connections in order to get an overall picture of quality of those connections and the services that run over them.

Figure 4:
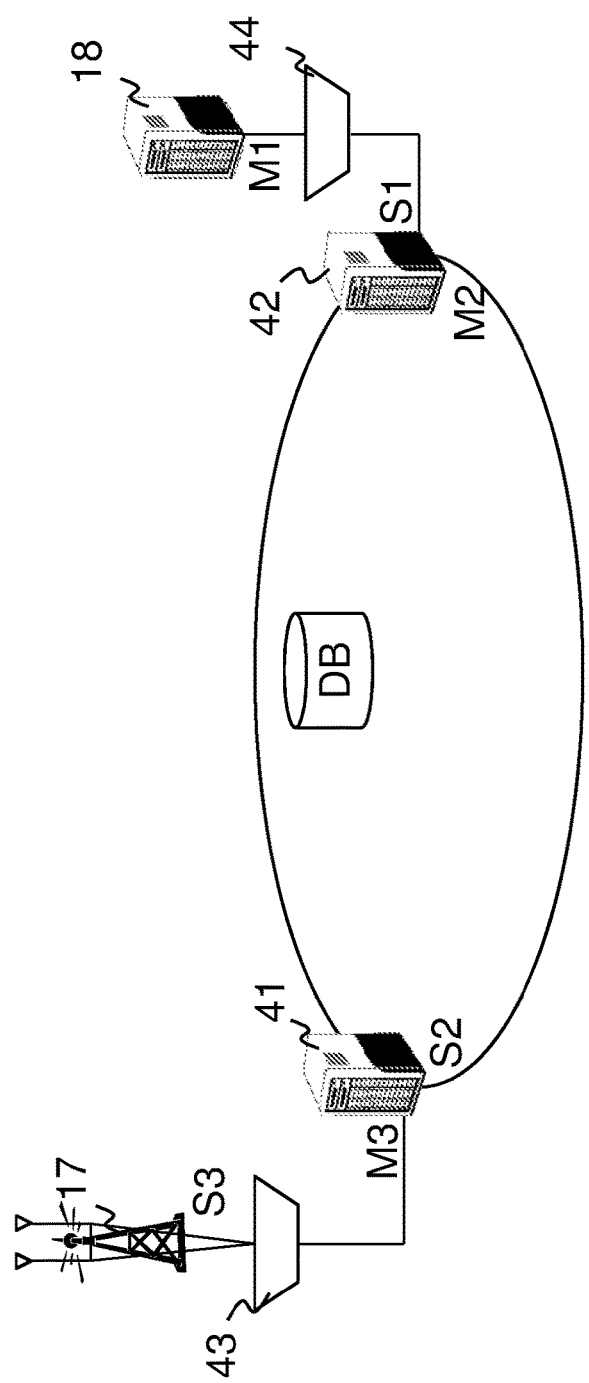
FIG. 4 is a depicting a system according to embodiments herein.

FIG. 4 is a schematic overview depicting a system according to embodiments herein. With reference to FIG. 4 a detailed example will be described on how RRU and MU may be connected seamlessly or ad-hoc using the network node 16, exemplified below as a first CPRI Pseudo Master/ Slave (CPMS) 41 and a second CPMS 42. It is up to the specific implementation to decide whether to implement CPMS as a central entity or as distributed entities on each access node, the latter is illustrated in the FIG. 4. Two antennas on the first unit 17, as the first unit 17 is exemplified as an RRU, are connected to an Optical Distribution Network (ODN), which is the physical fiber and devices that distribute signals to equipments in the system. CPRI on a first unit 17, always acts as a standard CPRI Slave, denoted herein as a third slave S3. A main unit illustrated as an example of the second unit 18, acts as a CPRI Master, denoted herein as a first master M1. The ODN automatically assigns wavelength for each antenna connected e.g. one per port on the first unit 17. This is part of the WDM-PON or equivalent solutions used. An optical layer may be pre-configured to forward all lambdas from the first unit 17 access ports to a first CPMS 41, which comprises a virtual master, denoted herein as a third master M3. Hence, the third slave S3 is automatically forwarded to the third master M3. The first CPMS 41 may easily use CPRI negotiation procedures to also identify which role is on the other side, e.g. the third slave S3. The first CPMS 41 negotiates over the connection between M3 and S3 CPRI rate and exchange control data such as topology data e.g. control and management information, such as RRU/antenna characteristics, vendor and/or similar. Established CPRI rates may later be modified, without violating standard CPRI procedures. All control data such as connections/stub link information registered on e.g. a CPRI enabled Packet Opto Integration node (C-POINT) is henceforth assumed to be registered in the DB, which in turn may be based on extensions from existing routing/link state protocols. As an example, GMPLS could be extended so that it also disseminates any registered MU/RRU information, in terms of routing/topology information related to RRU/MUs connected, thus enabling the system to connect MU/RRUs in an optimum way. Whenever a RRU or MU is connected, the first CPMS 41 will extract information from this unit and inject into the globally available network database. The first CPMS 41 or other higher order connectivity manager may then use this control data to find the optimal connection between RRU and MU and connect them.

By some means, including through control data extracted from the first unit 17, the first CPMS 41 establishes that an appropriate Main Unit is the second unit 18 which is reached through a second CMPS 42. Finding the correct or appropriate units to interconnect may be based on, for example, that the second unit 18 has capacity left to serve first unit 17, or it may be that the second unit 18 supports the same radio standard, e.g. GSM, WCDMA, or LTE, as the first unit 17, or it could be based on that the first and second units 17,18 are from the same vendors, or that a geographical distance between the first and second units 17, 18 is optimal for them to interconnect, or any combination of the above and beyond. In the illustrated example, the second unit 18 is already connected to the system via the first master M1 and a first slave Si relationship to the second CMPS 42. At least, such a connection has been established in the past, but may be inactive currently, so that a virtual slave entity, i.e. the first slave S1 has had an opportunity to examine, via standard CPRI control & management channels, capabilities of the second unit 18. In addition the optical network 15 of which the first slave S1 forms part, has published, via GMPLS or other, characteristics that help or aid in choosing this second unit 18 for particular first units, depending on geography/technology and other factors as stated above.

In this particular case, the first and second CMPS 41,42 and other optical switches use out-of-band signaling, e.g. GMPLS, over an interface between a second slave S2 and a second master M2, to agree in connecting master interface of the first master M1 directly to the slave interface of the third slave S3, through the optical switches of nodes that are part of the physical path. As the first master M1 discovers the third slave S3, and vice-versa, they will automatically start to negotiate for CPRI rates. For the third slave S3 this will be perceived as a re-negotiation, and for the first master M1 as a new remote radio unit to connect to. The chain between the first master M1 and the third slave S3 is thus completed. After this, renegotiations may occur e.g. for rates etc. by means of CPRI control channels, and GMPLS for adaptation of underlying optical connectivity. Master interface of the third master M3 may choose to multiplex wavelengths over a multiplexer 43 from the third slave S3 onto one shared wavelength i.e. by multiplexing the individual antenna CPRI IQ data onto a higher order CPRI flow, or it may optional not to, depending on available resources in the optical network and other aspects. The data flow may then demultiplex wave lengths in a demultiplexer 44, towards the second unit 18.

Whilst providing capabilities of connecting main and remote radio units ad-hoc to the system, embodiments herein are still fully CPRI compatible and may hence enable most advanced radio features, e.g. up-link Cooperative Multi-Point (COMP) to be implemented. Embodiments herein relate to two domains, an optical domain and also radio domain, so that we can use standard GMPLS or other packet domain routing/control/OAM mechanisms and apply those to a control of antennas. By using the Virtual Master/Slave entities, we may connect any RRU and MU to the system prior to establishing a specific MU-RRU topology, and do this transparently to the involved standard RRU/MU devices.

Figure 5:
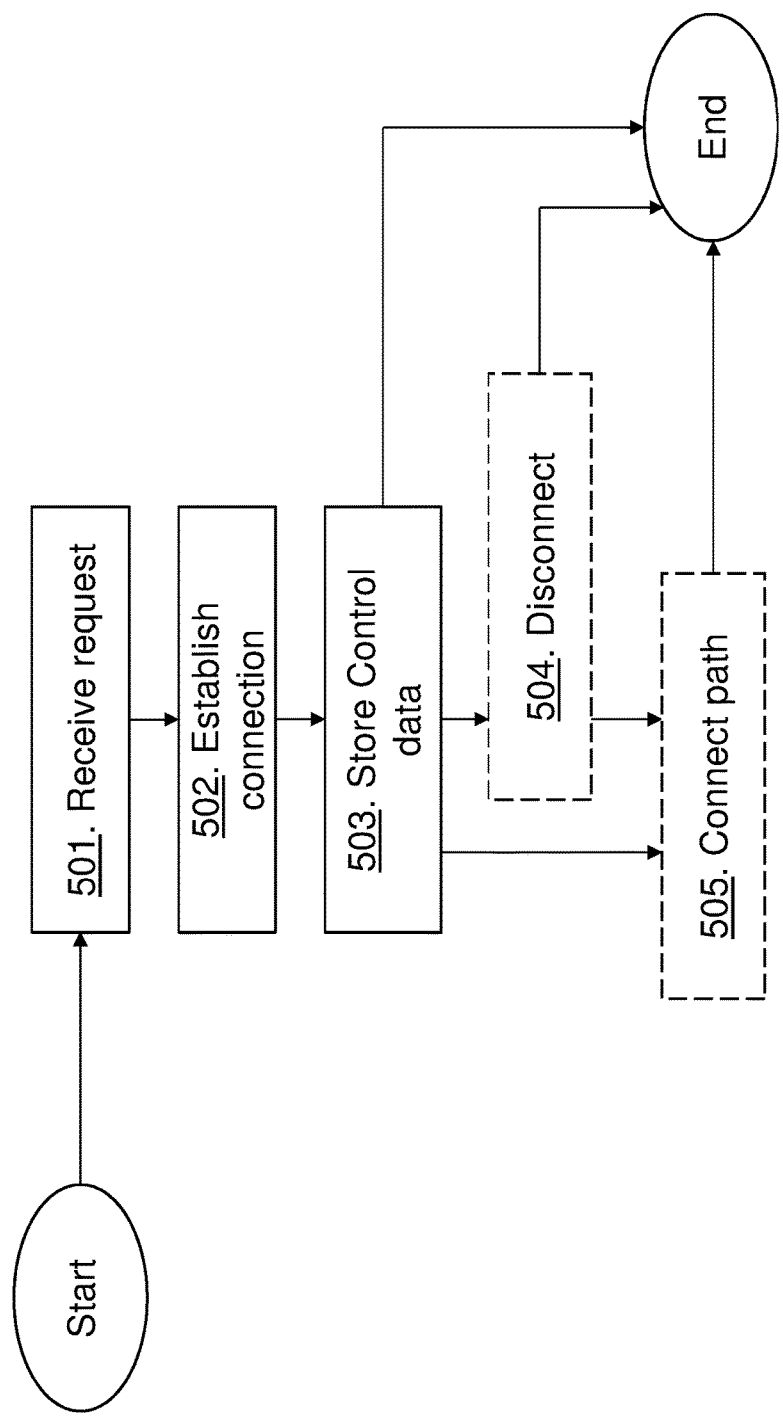
FIG. 5 is a schematic flowchart depicting a method in a network node according to embodiments herein.

The method actions in the network node 16 for enabling the first unit 17 to connect or to be connected ad-hoc to the second unit 18 in the system configured for remote radio units and main units according to some general embodiments will now be described with reference to a flowchart depicted in FIG. 5. The actions do not have to be taken in the order stated below, but may be taken in any suitable order. Actions that are only performed in some embodiments are marked with a dashed box. The network node 16 is comprised in an optical network 15

Action 501. The network node 16 receives a connection request from the first unit 17 over the optical network 15.

Action 502. The network node 16 establishes a connection, to the first unit 17, for control data.

Action 503. The network node 16 stores control data regarding the first unit 17. The control data is retrieved from the first unit 17 over the established connection. The control data enables the first unit 17 to connect or to be connected ad-hoc to the second unit 18 for transferring user data over a physical path through the optical network 15.

Action 504. In some embodiments the network node 16 disconnects the established connection for control data.

Action 505. In some embodiments the network node 16 connects ad-hoc the first unit 17 to the second unit 18 according to a determined physical path through the optical network 15. The determined path is based on the stored control data. In some embodiments the network node 16 connects and keeps the network node 16 in the determined physical path, e.g. when the first unit 17 is a remote radio unit and the second unit 18 is a main unit. The network node 16 may connect after disconnection of the established connection.

The first unit 17 may be a remote radio unit and the second unit 18 is a main unit. Alternatively, the first unit 17 may be a main unit and the second unit 18 may be a remote radio unit. The first unit 17 may be connected to the second unit 18 over a Common Public Radio Interface and the user data is In-phase Quadrature data. The network node 16 may comprise an interface that is split in a control plane and a data plane. The control plane comprises at least one virtual master entity and at least one virtual slave entity enabling the network node 16 to establish the connection for control data.

Figure 6:
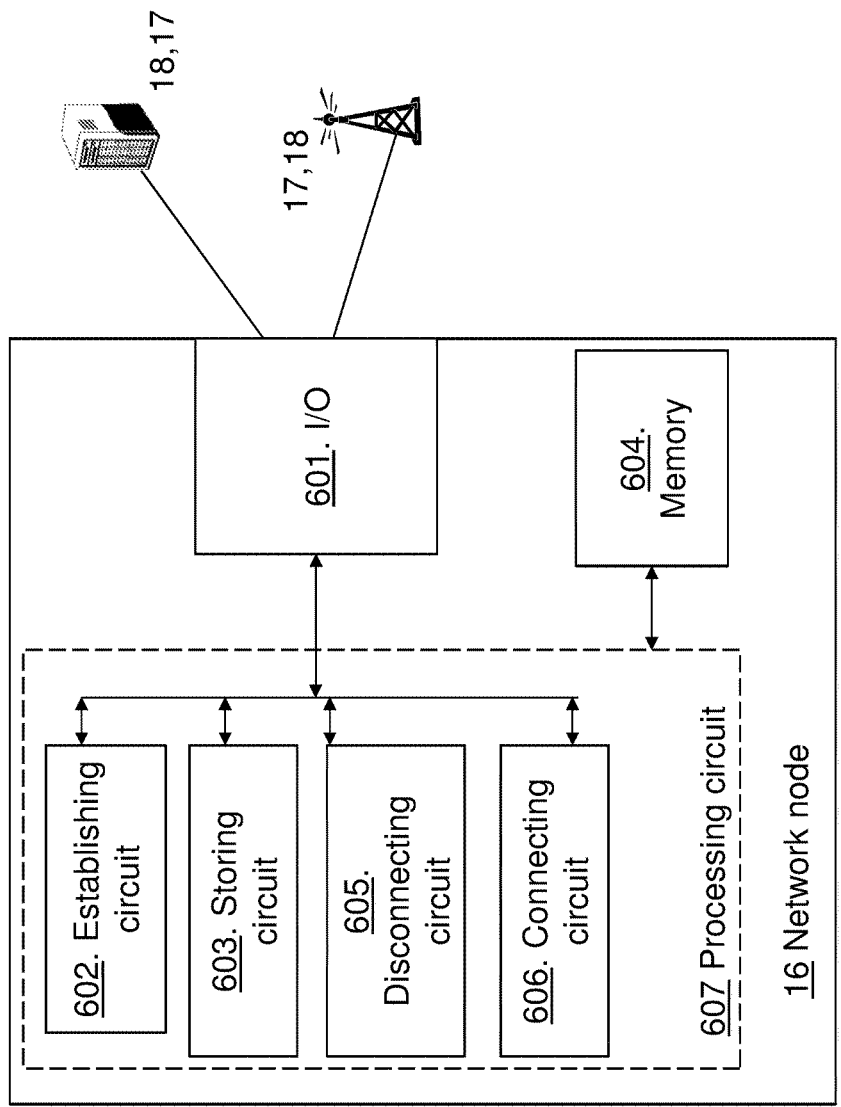
FIG. 6 is a block diagram depicting a network node according to embodiments herein.

FIG. 6 is a block diagram depicting the network node 16 adapted for enabling a first unit 17 to connect or to be connected ad-hoc to a second unit 18 in a system configured for remote radio units and main units. The network node 16 is configured to be comprised in an optical network 15.

The network node 16 comprises an input or output interface (I/O) 601 configured to receive a connection request from the first unit 17 over the optical network 15.

The network node 16 further comprises an establishing circuit 602 configured to establish a connection, to the first unit 17, for control data.

The network node 16 further comprises a storing circuit 603 configured to store control data regarding the first unit 17 e.g. locally in a memory 604 or externally in a database. The control data, retrieved from the first unit 17 over the established connection, enables the first unit 17 to connect or to be connected ad-hoc to the second unit 18 for transferring user data over a physical path through the optical network 15.

Moreover, the network node 16 may comprise a disconnecting circuit 605 configured to disconnect the established connection for control data.

The network node 16 further comprises connecting circuit 606 configured to connect ad-hoc the first unit 17 to the second unit 18 according to a determined physical path through the optical network 15. The determined path is based on the stored control data. The connecting circuit 606 may be configured to keep the network node 16 in the determined physical path. The connecting circuit 606 may be configured to perform the connecting process after disconnection of the established connection.

As stated above, the first unit 17 may be a remote radio unit and the second unit 18 may be a main unit. Alternatively, the first unit 17 may be a main unit and the second unit 18 may be a remote radio unit. The network node 16 comprises an interface that is split in a control plane and a data plane. The control plane comprises at least one virtual master entity and at least one virtual slave entity enabling the establishing circuit 602 to establish the connection to the second unit 18. The first unit 17 may be enabled to connect or to be connected ad-hoc to the second unit 18 over a Common Public Radio Interface and the user data is In-phase Quadrature data.

The embodiments herein for enabling a first unit 17 to connect or to be connected ad-hoc to a second unit 18 in a system configured for remote radio units and main units may be implemented through one or more processors, such as a processing circuit 607 in the network node 16 depicted in FIG. 6, together with computer program code for performing the functions and/or method steps of the embodiments herein. The program code mentioned above may also be provided as a computer program product, for instance in the form of a data carrier carrying computer program code for performing embodiments herein when being loaded into the network node 16. One such carrier may be in the form of a CD ROM disc. It is however feasible with other data carriers such as a memory stick. The computer program code may furthermore be provided as pure program code on a server and downloaded to the network node 16.

The memory 604 may comprise one or more memory units and may be used to store for example data such as control data, and applications to perform the methods herein when being executed on the network node 16.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

By using e.g. Virtual Master/Slave entities, any RRU and MU are connectable to the system prior to establishing a specific MU-RRU topology, and this may be transparently to the involved standard RRU/MU devices.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments described herein being defined by the following claims.

The invention claimed is:

1. A method in a network node configured in an optical network for enabling a first unit to connect or to be connected ad-hoc to a second unit, the method comprising:
   receiving a connection request from the first unit over the optical network, wherein the first unit includes a main unit of a radio base station;
   establishing a connection, to the first unit, for retrieving control data; and
   storing the control data regarding the first unit retrieved from the first unit over the established connection, and wherein the control data enables the first unit to connect or to be connected ad-hoc to the second unit for transferring user data over a physical path through the optical network, wherein the second unit includes a remote radio unit (RRU) of the radio base station.

2. The method according to claim 1, further comprising:
   connecting ad-hoc the first unit to the second unit according to a determined physical path through the optical network, wherein the determined physical path is based on the stored control data.

3. The method according to claim 2, wherein the connecting is performed keeping the network node in the determined physical path.

4. The method according to claim 2, further comprising disconnecting the established connection for control data.

5. The method according to claim 4, wherein the connecting is performed after disconnecting the established connection.

6. The method according to claim 1, wherein the network node comprises an interface that is split in a control plane and a data plane, and wherein the control plane comprises at least one virtual master entity and at least one virtual slave entity enabling the establishing of the connection.

7. The method according to claim 1, wherein the first unit is connected or is to be connected to the second unit over a Common Public Radio Interface and the user data is In-phase Quadrature data.

8. A network node configured in an optical network, the network node operative to enable a first unit to connect or to be connected ad-hoc to a second unit, the network node comprises:
- an input or output interface operative to receive a connection request from the first unit over the optical network, wherein the first unit includes a main unit of a radio base station;
- an establishing circuit operative to establish a connection, to the first unit, for control data; and
- a storing circuit operative to store control data regarding the first unit, wherein the control data, retrieved from the first unit over the established connection, enables the first unit to connect or to be connected ad-hoc to the second unit to transfer user data over a physical path through the optical network, wherein the second unit includes a remote radio unit (RRU) of the radio base station.

9. The network node according to claim 8, further comprising:
- a connecting circuit operative to connect ad-hoc the first unit to the second unit according to a determined physical path through the optical network, wherein the determined physical path is based on the stored control data.

10. The network node according to claim 9, wherein the connecting circuit is operative to keep the network node in the determined physical path.

11. The network node according to claim 10, further comprising:
- a disconnecting circuit operative to disconnect the established connection for control data.

12. The network node according to claim 9, wherein the connecting circuit is operative to connect ad-hoc the first unit to the second unit after disconnection of the established connection.

13. The network node according to claim 8, wherein the network node comprises an interface that is split in a control plane and a data plane, and wherein the control plane comprises at least one virtual master entity and at least one virtual slave entity that enable the establishing circuit to establish the connection to the second unit.

14. The network node according to claim 8, wherein the first unit is enabled to connect or to be connected ad-hoc to the second unit over a Common Public Radio Interface and the user data is In-phase Quadrature data.

15. A non-transitory computer-readable storage medium storing program code which when executed by one or more processors of a network node, cause the network node to:
- receive a connection request from a first unit over an optical network, wherein the first unit includes main unit of a radio base station;
- establish a connection, to the first unit, to retrieve control data; and
- store the control data regarding the first unit retrieved from the first unit over the established connection, and wherein the control data enables the first unit to connect or to be connected ad-hoc to a second unit for transferring user data over a physical path through the optical network, wherein the second unit includes a remote radio unit (RRU) of the radio base station.

16. The non-transitory computer-readable storage medium according to claim 15, wherein the program code further causes the network node to:
- connect ad-hoc the first unit to the second unit according to a determined physical path through the optical network, wherein the determined physical path is based on the stored control data.

17. The non-transitory computer-readable storage medium according to claim 16, wherein the network node is kept in the determined physical path that connects the first unit and the second unit.

18. The non-transitory computer-readable storage medium according to claim 17, wherein the program code further causes the network node to:
- connect the first unit and the second unit after disconnection of the established connection.

* * * * *

UNITED STATES PATENT AND TRADEMARK OFFICE
CERTIFICATE OF CORRECTION

PATENT NO.        : 9,692,514 B2
APPLICATION NO.   : 15/377074
DATED             : June 27, 2017
INVENTOR(S)       : Laraqui Page 1 of 2

It is certified that error appears in the above-identified patent and that said Letters Patent is hereby corrected as shown below:

On the Title Page

In the Figure, delete "18, 17" and insert -- 18 --, therefor.

In the Figure, delete "17, 18" and insert -- 17 --, therefor.

In the Figure, delete "607" and insert -- 607. --, therefor.

In the Drawings

In Fig. 6, Sheet 6 of 6, delete "607" and insert -- 607. --, therefor.

In the Specification

In Column 1, Line 10, delete "2014," and insert -- 2014, now Pat. No 9,553,668, --, therefor.

In Column 1, Line 25, delete "networks" and insert -- networks, --, therefor.

In Column 1, Line 28, delete "(3GPP)" and insert -- (3GPP), --, therefor.

In Column 1, Line 64, delete "(I/Q)" and insert -- (IQ) --, therefor.

In Column 2, Line 7, delete "Wave" and insert -- Wavelength --, therefor.

In Column 2, Line 21, delete "Entity Controller (REC), a Radio Entity" and
insert -- Equipment Controller (REC), a Radio Equipment --, therefor.

In Column 3, Line 46, delete "FIG. 4 is a" and insert -- FIG. 4 is a schematic overview --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,692,514 B2

In Column 5, Line 8, delete "(OAM)." and insert -- (O&M). --, therefor.

In Column 5, Line 10, delete "(OAM)" and insert -- (O&M) --, therefor.

In Column 5, Line 37, delete "denoted" and insert -- denoted as --, therefor.

In Column 5, Line 63, delete "18 units" and insert -- 18 --, therefor.

In Column 6, Line 6, delete "pools:" and insert -- pools. --, therefor.

In Column 6, Line 21, delete "first main unit 12" and insert -- first main unit 13 --, therefor.

In Column 7, Line 44, delete "CMPS" and insert -- CPMS --, therefor.

In Column 7, Line 55, delete "Si" and insert -- S1 --, therefor.

In Column 7, Line 55, delete "CMPS" and insert -- CPMS --, therefor.

In Column 7, Line 65, delete "CMPS" and insert -- CPMS --, therefor.

In Column 8, Line 24, delete "(COMP)" and insert -- (CoMP) --, therefor.

In Column 8, Line 27, delete "routing/control/OAM" and insert -- routing/control/O&M --, therefor.